US012249185B2

(12) United States Patent
Fralick et al.

(10) Patent No.: US 12,249,185 B2
(45) Date of Patent: *Mar. 11, 2025

(54) SYSTEM AND METHOD FOR EXERCISE TYPE RECOGNITION USING WEARABLES

(71) Applicant: Google LLC, Mountain View, CA (US)

(72) Inventors: Mark Fralick, San Diego, CA (US); Brian Chen, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/524,615

(22) Filed: Nov. 30, 2023

(65) Prior Publication Data

US 2024/0096136 A1  Mar. 21, 2024

Related U.S. Application Data

(63) Continuation of application No. 17/419,368, filed as application No. PCT/US2020/043997 on Jul. 29, 2020, now Pat. No. 11,842,571.

(51) Int. Cl.
*G06V 40/20* (2022.01)
*G06V 10/778* (2022.01)
*G06V 10/80* (2022.01)

(52) U.S. Cl.
CPC ............ *G06V 40/20* (2022.01); *G06V 10/778* (2022.01); *G06V 10/809* (2022.01)

(58) Field of Classification Search
CPC .... G06V 40/20; G06V 10/778; G06V 10/809; G06V 10/454; G06V 40/23; G06F 18/24147; G06F 18/251

See application file for complete search history.

(56) References Cited

U.S. PATENT DOCUMENTS 11,158,426 B1 * 10/2021 Lo .......................... G16H 50/20
11,622,717 B1 *  4/2023 Jovanov ................. A61B 5/277
                                                              600/301

(Continued)

FOREIGN PATENT DOCUMENTS

CN      103322956 A     9/2013
CN      106874874 A     6/2017
CN      111382599 A     7/2020

OTHER PUBLICATIONS

Bloomfield et al. A Convolutional Neural Network Approach to Classifying Activities Using Knee Instrumented Wearable Sensors. Dec. 15, 2020. IEEE Sensors Journal, IEEE Service Center, New York, NY, US, vol. 20, No. 24, pp. 14975-14983, DOI: 10.1109/JSEN.2020.3011417.

(Continued)

*Primary Examiner* — Ming Y Hon
(74) *Attorney, Agent, or Firm* — Lerner David LLP

(57) ABSTRACT

The present disclosure provides for using multiple inertial measurement units (IMUs) to recognize particular user activity, such as particular types of exercises and repetitions of such exercises. The IMUs may be located in consumer products, such as smartwatches and earbuds. Each IMU may include an accelerometer and a gyroscope, each with three axes of measurement, for a total of 12 raw measurement streams. A training image includes a plurality of subplots or tiles, each depicting a separate data stream. The training image is then used to train a machine learning model to recognize IMU data as corresponding to a particular type of exercise.

20 Claims, 11 Drawing Sheets

(56) References Cited

U.S. PATENT DOCUMENTS

| | | | |
|---|---|---|---|
| 11,623,738 B1* | 4/2023 | Auerbach | B64C 13/16 |
| | | | 701/4 |
| 11,842,571 B2* | 12/2023 | Fralick | G06F 18/251 |
| 2016/0256082 A1 | 9/2016 | Ely et al. | |
| 2017/0265584 A1* | 9/2017 | Walker | A43B 3/34 |
| 2018/0055375 A1* | 3/2018 | Martinez | A61B 5/742 |
| 2018/0296157 A1* | 10/2018 | Bleich | A61B 7/00 |
| 2019/0121300 A1* | 4/2019 | Peterson | G04G 99/006 |
| 2019/0224529 A1* | 7/2019 | Jung | A63B 24/0075 |
| 2019/0356948 A1 | 11/2019 | Stojancic et al. | |
| 2020/0111384 A1* | 4/2020 | Bell | A61B 5/11 |
| 2020/0188629 A1* | 6/2020 | Levenberg | A61N 1/3603 |
| 2020/0194021 A1* | 6/2020 | Kim | H04R 1/1016 |
| 2020/0214595 A1* | 7/2020 | Roberts | A61B 5/1038 |
| 2020/0218974 A1* | 7/2020 | Cheng | G06N 3/044 |
| 2020/0267487 A1* | 8/2020 | Siva | H04R 1/1091 |
| 2020/0279339 A1* | 9/2020 | Akutagawa | G06F 16/90324 |
| 2020/0398076 A1* | 12/2020 | Tolani | A61N 5/0618 |
| 2021/0144134 A1* | 5/2021 | Kurylko | H04L 63/0869 |
| 2021/0320918 A1* | 10/2021 | Mars | H04L 63/0807 |
| 2022/0054039 A1* | 2/2022 | Rahman | A61B 5/08 |
| 2022/0095954 A1* | 3/2022 | Gupta | A61B 5/6829 |
| 2022/0176201 A1* | 6/2022 | Wehba | A61B 5/0205 |
| 2023/0021945 A1* | 1/2023 | Chandrashekar | G16H 30/20 |
| 2023/0046410 A1* | 2/2023 | Widjaja | G06V 20/182 |
| 2023/0081657 A1* | 3/2023 | Zaphrir | G16H 10/60 |
| | | | 600/301 |
| 2023/0115973 A1* | 4/2023 | Menon | H04W 4/40 |
| | | | 370/312 |
| 2023/0235267 A1* | 7/2023 | Schlack | C12M 23/40 |
| | | | 435/293.1 |

OTHER PUBLICATIONS

Morris et al. RecoFit: Using a Wearable Sensor to Find, Recognize, and Count Repetitive Exercises. Apr. 26, 2014. Proceedings of the SIGCHI Conference on Human Factors in Computing Systems, ACM. 2 Penn Plaza, Suite 701, New York, NY 10121-0701 USA, pp. 3225-3234, DOI: 10.1145/2556288.2557116.

International Search Report and Written Opinion for International Application No. PCT/US2020/043997 dated Mar. 23, 2021. 16 pages.

International Preliminary Report on Patentability for International Application No. PCT/US2020/043997 dated Feb. 9, 2023. 10 pages.

Office Action for European Patent Application No. 20757104.3 dated Mar. 24, 2023. 6 pages.

Skawinski et al. "Workout Type Recognition and Repetition Counting with CNNs from 3D Acceleration Sensed on the Chest" dated May 2019; https://www.researchgate.net/publication/333625301_Workout_TypeRecognition_and_Repetition_Counting_with_CNNs_from_3D_Acceleration_Sensed_on_the_ Chest (Year: 2019).

Office Action for European Patent Application No. 20757104.3 dated Sep. 21, 2023. 7 pages.

Summons to Oral Proceedings for European Patent Application No. 20757104.3 dated Mar. 20, 2024. 9 pages.

Office Action for Chinese Patent Application No. 202080008515.X dated Aug. 20, 2024. 9 pages.

* cited by examiner

SYSTEM AND METHOD FOR EXERCISE TYPE RECOGNITION USING WEARABLES

CROSS-REFERENCE TO RELATED APPLICATIONS

This application is a continuation of U.S. patent application Ser. No. 17/419,368, filed on Jun. 29, 2021, which is a national phase entry under 35 U.S.C. § 371 of International Application No. PCT/US2020/043997, filed on Jul. 29, 2020, the entire disclosures of which are incorporated herein by reference.

BACKGROUND

Activity recognition using inertial sensors has historically been implemented by engineering complicated "features" from the raw sensor data, such as deviation, peak to peak, zero crossings, kurtosis, and a whole host of other measurable quantities. These features are then used as inputs to machine learning models such as support vector machines, random forests, k-nearest neighbors, etc. Figuring out what features are important or useful for machine learning, or which model type to use is a very difficult task, requiring a large amount of expertise and specialized knowledge.

There has been some initial investigation into using an image based neural network to accomplish Inertial Measurement Unit (IMU) activity recognition. Image based models tend to be much more mature and generalized. In this sense, the "feature" based models appear similar to "feature" based extraction in earlier days of image recognition, which had limited success. Existing image based systems use a peak and threshold detector to determine where to window a single repetition of an exercise type. However, the threshold will vary person to person, and can be easily spoofed in the presence of noise. Also, there is no universal guidance for this method across all exercise types, requiring a custom analytic window detection methodology for each possible exercise type, while also trying to make the methodology robust across multiple users.

BRIEF SUMMARY

The present disclosure provides for using multiple IMUs to recognize particular user activity, such as particular types of exercises and repetitions of such exercises. The IMUs may be located in consumer products, such as smartwatches and earbuds.

One aspect of the disclosure provides a method for detecting exercise. The method includes receiving, by one or more processors, first sensor data from one or more first sensors of a first wearable device, receiving, by the one or more processors, second sensor data from one or more second sensors of a second wearable device, generating, by the one or more processors, an image based on the first sensor data and the second sensor data, the image comprising a plurality of subplots, wherein each subplot depicts a data stream, and determining, using the one or more processors, based on the image, a type of exercise performed by a user during receiving of the first sensor data and the second sensor data. Determining the type of exercise performed may include executing a machine learning model, such as an image based machine learning model. Further, the model may be trained, such as by generating one or more first training images based on data collected from the first and second wearable devices while the user performs a first type of exercise, and inputting the one or more first training images into the machine learning model as training data. Training may further include generating one or more second training images based on data collected from the first and second wearable devices while the user performs a second type of exercise, and inputting the one or more second training images into the machine learning model as training data, as well as generating one or more third training images based on data collected from the first and second wearable devices while the user performs one or more activities that are not classified as exercise, and inputting the one or more third training images into the machine learning model as examples of non-exercise. Generating the one or more first training images may include peak detection window segmentation, or fixed window segmentation. Fixed window segmentation may include varying a start time of a window having a predetermined length of time, wherein each variation of the start time in the window generates a separate one of the one or more first training images. The method may further include autoscaling a time length of the window based on a most recent repetition frequency estimate.

According to some examples, the method may further include determining a number of repetitions of the determined type of exercise. For example, this may include determining a repetition frequency using a sliding autocorrelation window, and computing the number of repetitions based on the repetition frequency and a duration of the type of exercise. In another example, determining the number of repetitions may include counting a number of repetitions in a training image, labeling the repetitions in the training image, and inputting the training image into a machine learning model as training data.

Another aspect of the disclosure provides a system for detecting exercise, including one or more first sensors in a first wearable device, one or more second sensors in a second wearable device, and one or more processors in communication with the one or more first sensors and the one or more second sensors. The one or more processors may be configured to receive first sensor data from the one or more first sensors of the first wearable device. receive second sensor data from the one or more second sensors of the second wearable device. generate an image based on the first sensor data and the second sensor data, the image comprising a plurality of subplots, wherein each subplot depicts a data stream, and determine, based on the image, a type of exercise performed by a user during receiving of the first sensor data and the second sensor data. According to some examples, the first wearable device may be an earbud and the second wearable device may be a smartwatch. The one or more processors may reside within at least one of the first wearable device or the second wearable device, and/or within a host device coupled to the first wearable device and the second wearable device.

Yet another aspect of the disclosure provides a non-transitory computer-readable medium storing instructions executable by one or more processors in for performing a method of detecting a type of exercise. Such method may include receiving first sensor data from one or more first sensors of a first wearable device, receiving second sensor data from one or more second sensors of a second wearable device generating an image based on the first sensor data and the second sensor data, the image comprising a plurality of subplots, wherein each subplot depicts a data stream, and determining based on the image, a type of exercise performed by a user during receiving of the first sensor data and the second sensor data.

DETAILED DESCRIPTION

Overview

The present disclosure provides for using multiple IMUs to recognize particular user activity, such as particular types of exercises and repetitions of such exercises. The IMUs may be located in consumer products, such as smartwatches and earbuds. Each IMU may include an accelerometer and a gyroscope, each with three axes of measurement, for a total of 12 raw measurement streams. In some examples, additional IMUs may also provide data, thus resulting in additional measurement streams. Further, each set of three axes can be combined into a spatial norm. Thus, in the example of two IMUs producing 12 data streams, adding the spatial norms would provide for a final total of 16 data capture tiles per training image.

The system and method described herein provides an ability to count repetitions of a single exercise without having to resort to using complicated window detection methodologies. A simple fixed overlapping window is used, and the number of repetitions may be determined using auto-correlation techniques, instantiation type convolutional neural networks (CNNs), or a combination of these or other techniques. The method may be deployed using efficient models, which may be retrainable in a final layer by the users themselves. For example, a user could retrain the model on their own device to recognize customizable exercise types, and their own unique motion profile during exercise.

Just a few examples of the types of exercises that may be detected include bicep curls, barbell press ups, push ups, sit ups, squats, chin-ups, burpees, jumping jacks, etc. It should be understood that any of a variety of additional types of exercises may be detected as well. The system may be trained by a user to detect a particular exercise selected or created by the user. In training the machine learning model, non-exercise may be included as well. For example, this may help to identify and distinguish other types of movements of the user, and thereby reduce false positive detection of exercises. Such non-exercise may include, by way of example only, walking, climbing stairs, opening doors, lifting various objects, sitting in chairs, etc.

Transfer learning may be implemented to retrain the top few layers of an efficient image recognition model, such as a MobileNet image recognition model. Images of IMU raw data subplots may be used as training examples, allowing for high accuracy with a small number of training examples.

Example Systems

Figure 1:
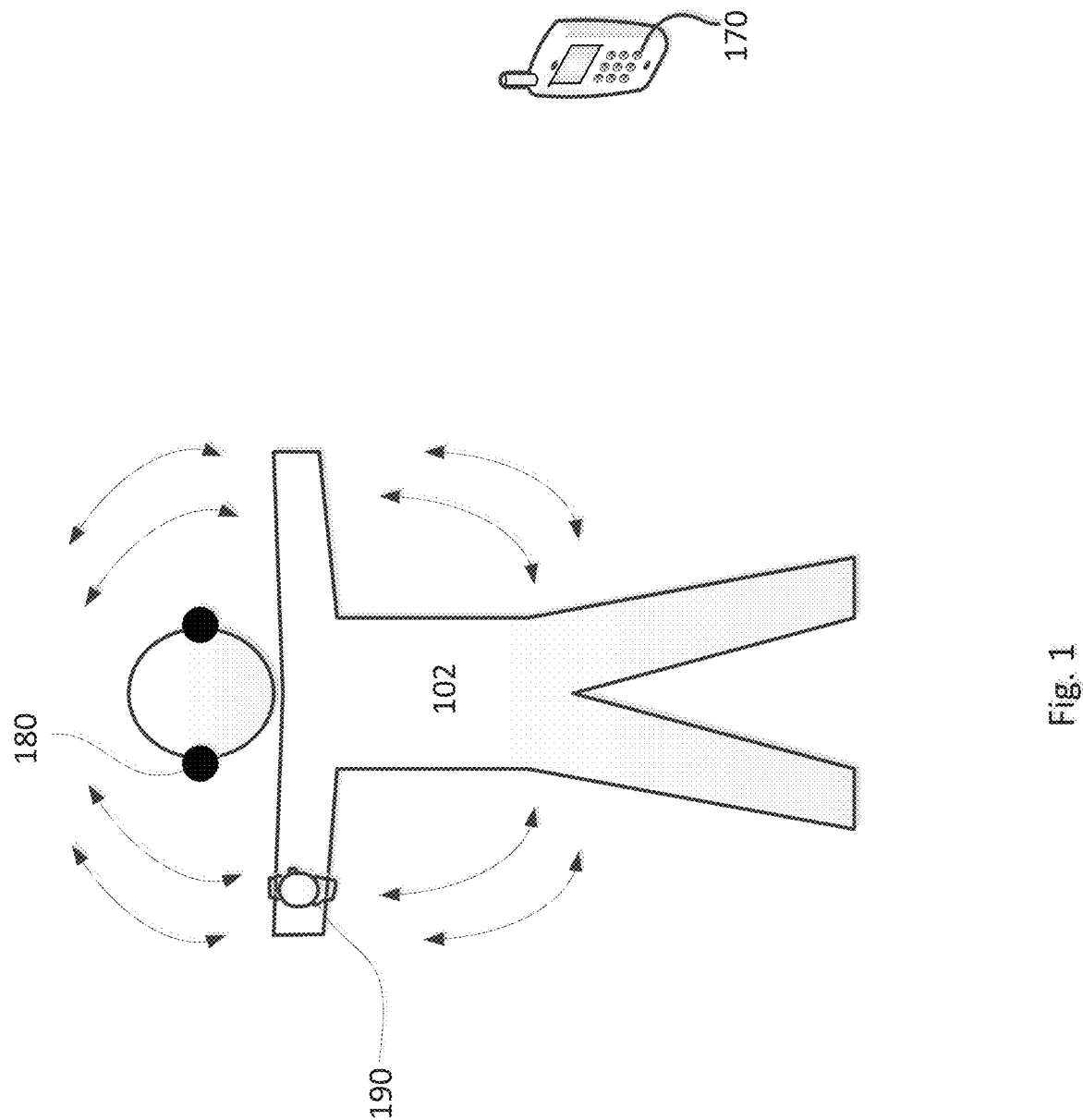
FIG. 1 is a pictorial diagram of an example system in use by a user according to aspects of the disclosure.

FIG. 1 is a pictorial diagram of an example system in use. User 102 is wearing wireless computing devices 180, 190. In this example, the wireless computing devices include earbuds 180 worn on the user's head and a smartwatch 190 worn on the user's wrist. The earbuds 180 and smartwatch 190 may be in wireless communication with a host computing device 170, such as a mobile phone. The host computing device 170 may be carried by the user, such as in the user's hand or pocket, or may be placed anywhere near the user. In some examples, the host computing device 170 may not be needed at all.

The wireless computing devices 180, 190 worn by the user may detect particular types of exercises and repetitions of such exercises performed by the user 102. For example, as shown the user 102 is doing jumping jacks. The smartwatch 190, which is typically fixed to the user's arm, will detect relatively large, quick, sweeping movements. The earbuds 190, which are typically fixed in the user's ears, will detect bouncing up and down. The wireless computing devices 180, 190 may communicate such detections to each other or to the host device 170. Based on the combination of detected movements, one or more of the devices 170-190 may detect that the user 102 is doing jumping jacks.

While in the example shown the wireless computing devices 180, 190 include earbuds and a smartwatch, it should be understood that in other examples any of a number of different types of wireless devices may be used. For example, the wireless devices may include a headset, a head-mounted display, smart glasses, a pendant, an ankle-strapped device, a waist belt, etc. Moreover, while two wireless devices are shown as being used to detect the exercises in FIG. 1, additional wireless devices may also be used. Further, while two earbuds 180 are shown, the readings detected by each earbud may be redundant, and therefore detection of the user's movements may be performed using only one earbud in combination with the smartwatch 190 or another device worn by the user 102.

Figure 2:
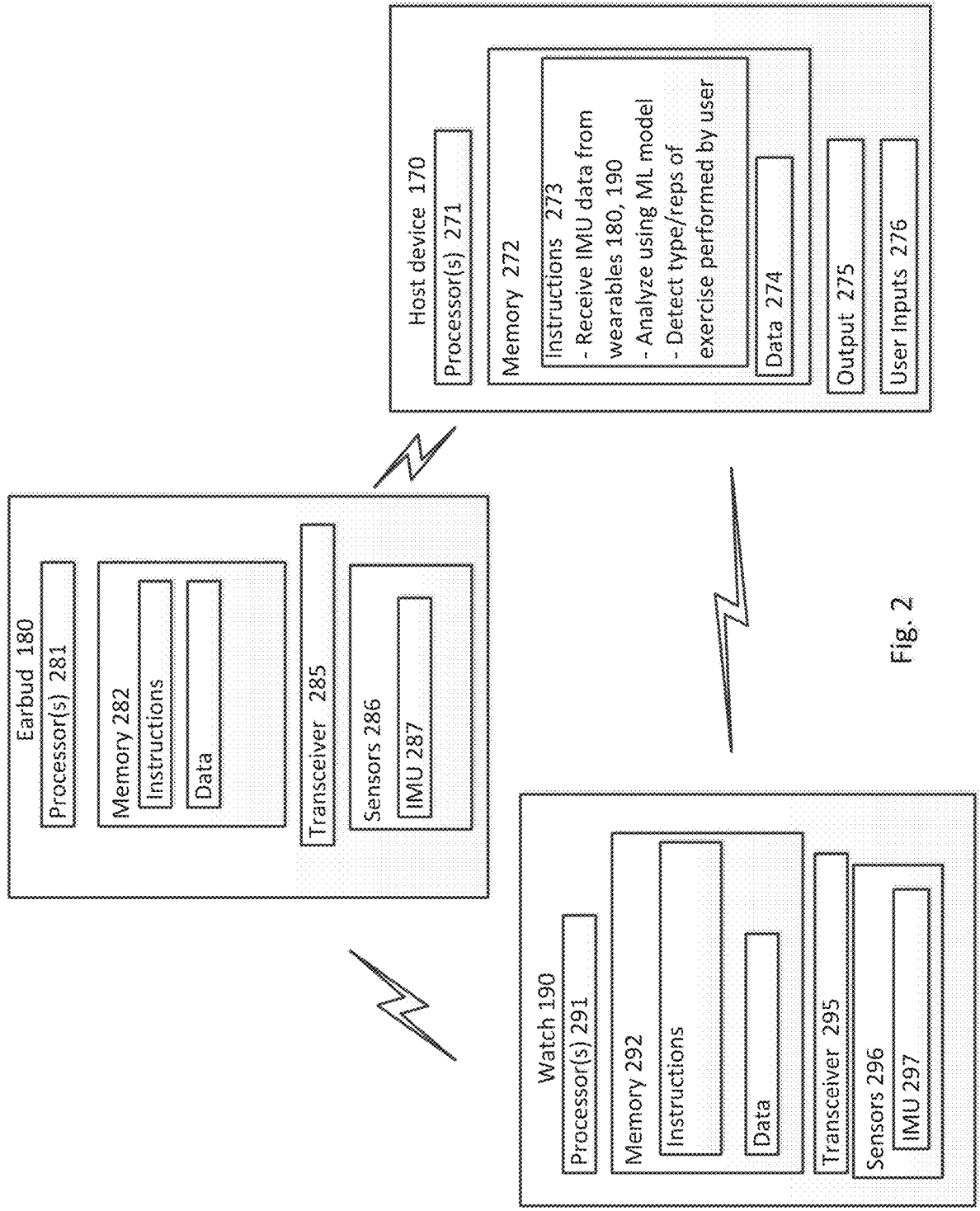
FIG. 2 is a block diagram of an example system according to aspects of the disclosure.

FIG. 2 further illustrates the wireless computing devices 180, 190, in communication with the host computing device 170, and features and components thereof.

As shown, each of the wearable wireless devices 180, 190 includes various components, such as processors 281, 291, memory 282, 292, transceiver 285, 295, and other components typically present in wearable wireless computing devices. The wearable devices 180, 190 may have all of the components normally used in connection with a wearable computing device such as a processor, memory (e.g., RAM and internal hard drives) storing data and instructions, user input, and output.

Each of the wireless devices 180, 190 may also be equipped with short range wireless pairing technology, such as a Bluetooth transceiver, allowing for wireless coupling with each other and other devices. For example, transceivers 285, 295 may each include an antenna, transmitter, and receiver that allows for wireless coupling with another device. The wireless coupling may be established using any of a variety of techniques, such as Bluetooth, Bluetooth low energy (BLE), etc.

Each of the wireless devices 180, 190 may further be equipped with one or more sensors 286, 296 capable of detecting the user's movements. The sensors may include, for example, IMU sensors 287, 297, such as an accelerometer, gyroscope, etc. For example, the gyroscopes may detect inertial positions of the wearable devices 180, 190, while the accelerometers detect linear movements of the wearable devices 180, 190. Such sensors may detect direction, speed, and/or other parameters of the movements. The sensors may additionally or alternatively include any other type of sensors capable of detecting changes in received data, where such changes may be correlated with user movements. For example, the sensors may include a barometer, motion sensor, temperature sensor, a magnetometer, a pedometer, a global positioning system (GPS), camera, microphone, etc. The one or more sensors of each device may operate independently or in concert.

The host computing device 170 may be, for example, a mobile phone, tablet, laptop, gaming system, or any other type of mobile computing device. In some examples, the mobile computing device 170 may be coupled to a network, such as a cellular network, wireless Internet network, etc.

The host device 170 may also include one or more processors 271 in communication with memory 272 including instructions 273 and data 274. The host device 170 may further include elements typically found in computing devices, such as output 275, input 276, communication interfaces, etc.

The input 276 and output 275 may be used to receive information from a user and provide information to the user. The input may include, for example, one or more touch sensitive inputs, a microphone, a camera, sensors, etc. Moreover, the input 276 may include an interface for receiving data from the wearable wireless devices 180, 190. The output 275 may include, for example, a speaker, display, haptic feedback, the interface with the wearable wireless devices for providing data to such devices, etc.

The one or more processor 271 may be any conventional processors, such as commercially available microprocessors. Alternatively, the one or more processors may be a dedicated device such as an application specific integrated circuit (ASIC) or other hardware-based processor. Although FIG. 2 functionally illustrates the processor, memory, and other elements of host 170 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of host 170. Accordingly, references to a processor or computing device will be understood to include references to a collection of processors or computing devices or memories that may or may not operate in parallel.

Memory 272 may store information that is accessible by the processors 271, including instructions 273 that may be executed by the processors 271, and data 274. The memory 272 may be of a type of memory operative to store information accessible by the processors 271, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 273 and data 274 are stored on different types of media.

Data 274 may be retrieved, stored or modified by processors 271 in accordance with the instructions 273. For instance, although the present disclosure is not limited by a particular data structure, the data 274 may be stored in computer registers, in a relational database as a table having a plurality of different fields and records, XML documents, or flat files. The data 274 may also be formatted in a computer-readable format such as, but not limited to, binary values, ASCII or Unicode. By further way of example only, the data 274 may be stored as bitmaps comprised of pixels that are stored in compressed or uncompressed, or various image formats (e.g., JPEG), vector-based formats (e.g., SVG) or computer instructions for drawing graphics. Moreover, the data 274 may comprise information sufficient to identify the relevant information, such as numbers, descriptive text, proprietary codes, pointers, references to data stored in other memories (including other network locations) or information that is used by a function to calculate the relevant data.

The instructions 273 may be executed to detect a type of exercise performed by the user based on raw data received from the sensors 286, 296 of the wireless wearable devices 180, 190. For example, the processor 271 may execute a machine learning algorithm whereby it compares images of the received raw data with stored image corresponding to particular exercises, and detects the exercise performed based on the comparison. Moreover, the instructions 273 may be executed to detect a number of repetitions of the exercise, such as by using a window.

In other examples, the analysis of the sensor data may be performed by either or both of the wearable wireless devices 180, 190. For example, each of the devices 180, 190 includes a processor 281, 291 and memory 282, 292, similar to those described above in connection with host device 170. These processors 281, 291 and memories 282, 292 may receive data and execute the machine learning algorithm to detect the type of exercise performed.

Figure 3:
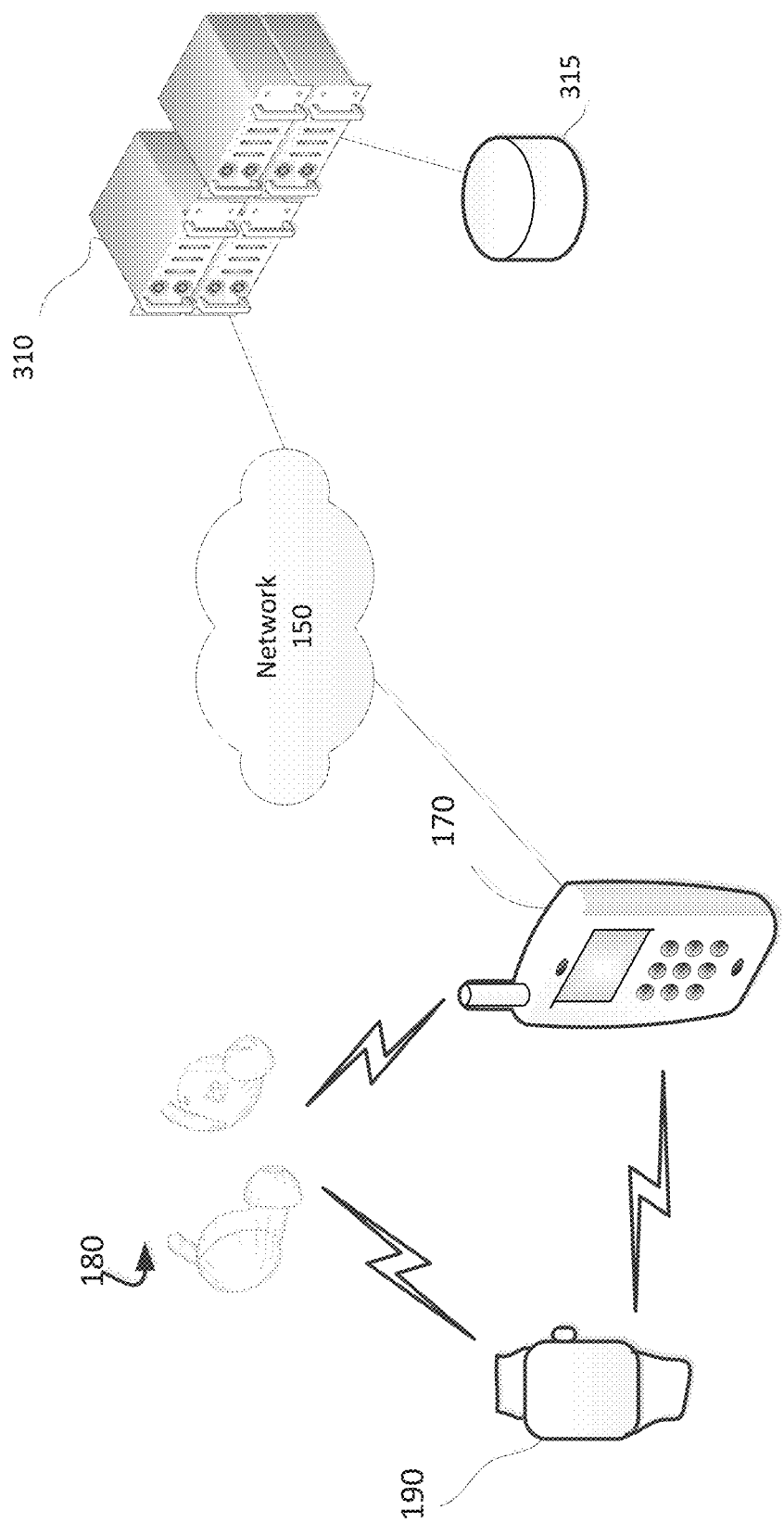
FIG. 3 is a pictorial diagram of another example system according to aspects of the disclosure.

FIG. 3 illustrates the wireless wearable devices 180, 190 in communication with each other and the host device 170. The wireless connections among the devices may be, for example, short range pairing connections, such as Bluetooth. Other types of wireless connections are also possible. In this example, the devices 170-190 are further in communication with server 310 and database 315 through network 150. For example, the wireless wearable devices 180, 190 may be indirectly connected to the network 150 through the host device 170. In other examples, one or both of the wireless wearable devices 180, 190 may be directed connected to the network 150, regardless of a presence of the host device 170.

These network 150 may be, for example, a LAN, WAN, the Internet, etc. The connections between devices and the network may be wired or wireless.

The server computing device 310 may actually include a plurality of processing devices in communication with one another. According to some examples, the server 310 may execute the machine learning model for determining a particular type of exercise being performed based on input from the IMUs of multiple wearable devices. For example, the wearable devices 180, 190 may transmit raw data detected from their IMUs to the server 310. The server 310 may perform computations using the received raw data as input, determine the type of exercise performed, and send the result back to the host 170 or one or both of the wearable devices 180, 190.

Databases 315 may be accessible by the server 310 and computing devices 170-190. The databases 315 may include, for example, a collection of data from various sources corresponding to particular types of exercises. For example, the data may include images of raw data streams from IMUs or other sensors in wearable devices, the raw data streams corresponding to particular types of exercise. Such data may be used in the machine learning model executed by the server 310 or by any of the host device 170 or the wearable devices 180, 190.

Regardless of whether the detection of exercise type is performed at the server 310, at the host 170, at one or both of the wearable devices 180, 190, or some combination thereof, any of several different types of computations may be performed. These different types include at least (1) peak detector window segmentation using input from multiple IMUs positioned on different locations of the user's body, or (2) fixed window segmentation from the multiple IMUs. Moreover, any of the devices 170-190 or 310 may be capable of counting the number of repetitions of each exercise.

Figure 4B:
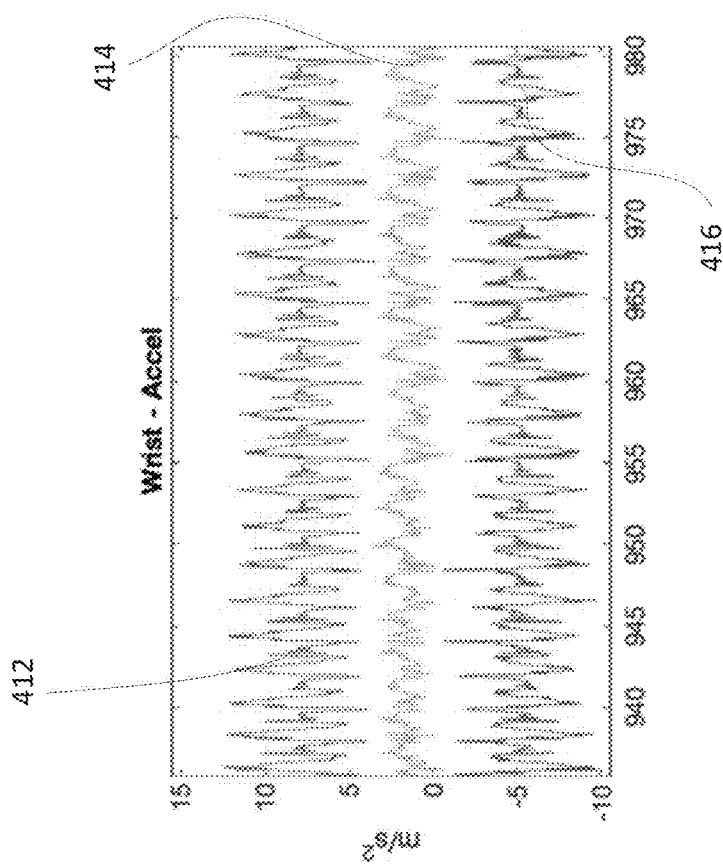
FIGS. 4A-4B illustrate example raw data according to aspects of the disclosure.
Figure 4A:
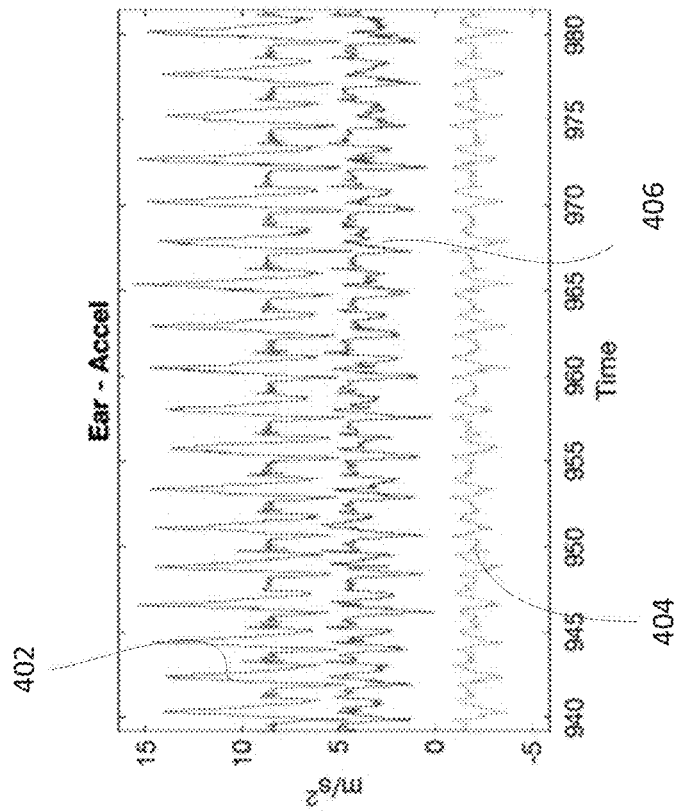

Peak detector window segmentation using input from multiple IMUs positioned on different locations of the user's body detects "peaks" in signal data, such as raw accelerometer and gyroscope data. FIG. 4A illustrates an example of raw accelerometer data from an earbud, and FIG. 4B illustrates an example of raw accelerometer data from a smartwatch. In this particular example, the data was obtained while doing squats, but it should be understood that the analysis can be applied to data for any of a variety of exercises. Each figure includes three waveforms: one for each of the x, y, and z directions. For example, in FIG. 4A, wave 402 corresponds to the y direction, such as a vertical direction; wave 406 corresponds to an x direction, such as lateral or side-to-side movement with respect to the user; and wave 404 corresponds to a z direction, such as forward/backward movement relative to the user. Similarly, in FIG. 4B, wave 412 corresponds to the y direction, wave 416 corresponds to the x direction, and wave 414 corresponds to the z direction.

The data from a first IMU may be timescaled to match time from a second IMU. For example, measurements from the IMU in an earbud may be timescaled to match measured time from an accelerometer in a smartwatch. This may include resampling all data to a length of the smartwatch accelerometer data. A low pass filter may be applied to the raw data. By way of example only, the low pass filter may be a Butterworth filter or any of a variety of other types of filter.

A "window" captures each repetition using custom peak detection and thresholding. A window, in peak detection segmentation, may refer to capturing one complete repetition of an exercise. The window may begin anywhere during the exercise repetition. For example, it could start in the middle of one pushup and end in the middle of a second pushup. The window may begin/end at a zero crossing, or some peak or trough, or any other feature that can be extracted from the data. For a fixed window, the window may be defined by a time length. For example, the time length may be 4 seconds, with windows overlapping every 2 seconds (50% overlap). This window may capture a partial repetition or multiple repetitions, depending on how fast the person exercises. Another option would be to have an autoscaling window, that autoscales the time length of the window based on the most recent repetition frequency estimate from the autocorrelation calculation. In that case the window is still determined by time, and may not exactly capture a full repetition. For example, the repetition length may be over or underestimated, but the time window would in general be close to the repetition length of the exercise.

Accordingly, for example, for a waveform of raw data received from an IMU during the exercise, a peak of the waveform is detected. Analysis of the waveform may further identify other characteristics to indicate the beginning and end of a repetition. If two IMUs are used, each having an x, y, and z axis, 12 raw data streams are included in each window. Adding 4 norms of each set of x, y, and z brings this to 16 data streams total. The norm may be computed as, for example, square_root($x^2+y^2+z^2$). Other mathematical manipulations could also be possible that may provide additional beneficial information to the model. Accordingly, 16 subplots are provided for each image, such as in a 4×4 grid.

Figure 5B:
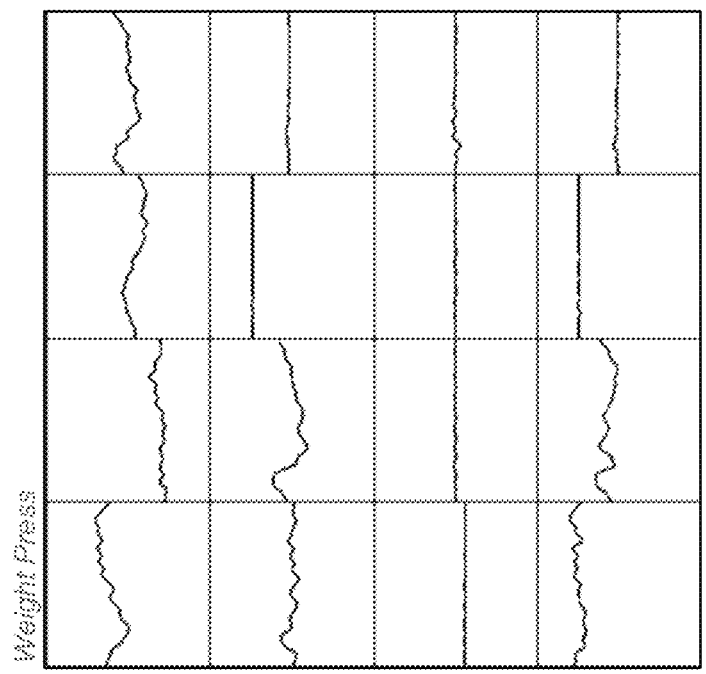
FIGS. 5A-E illustrate example images generating from data using a first technique and corresponding to various exercise types according to aspects of the disclosure.
Figure 5A:
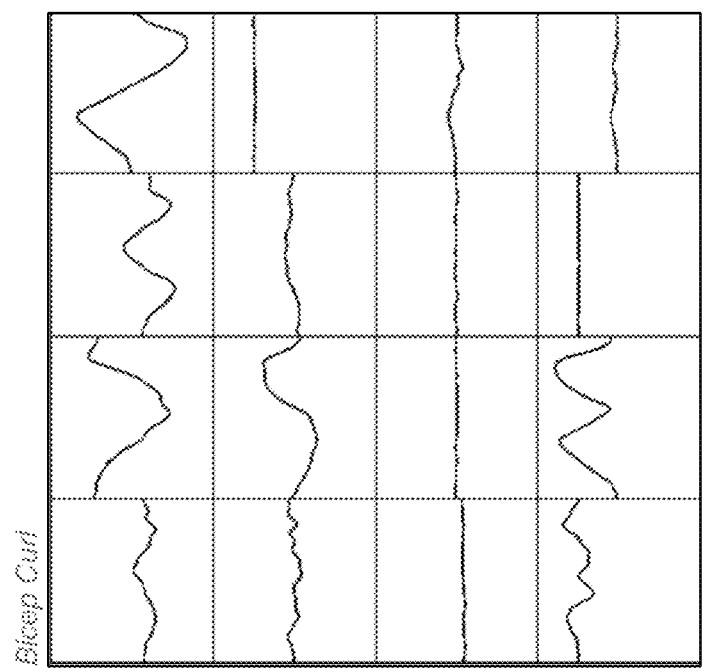
Figure 5D:
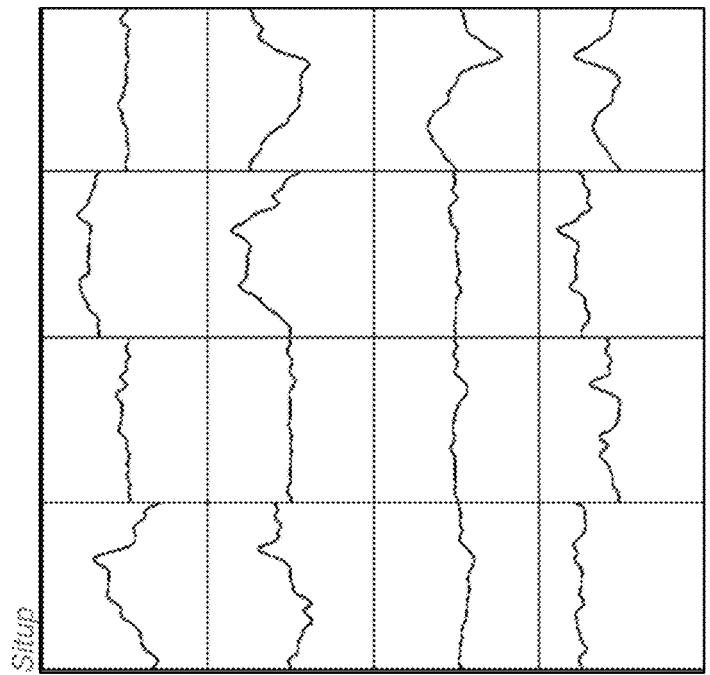
Figure 5C:
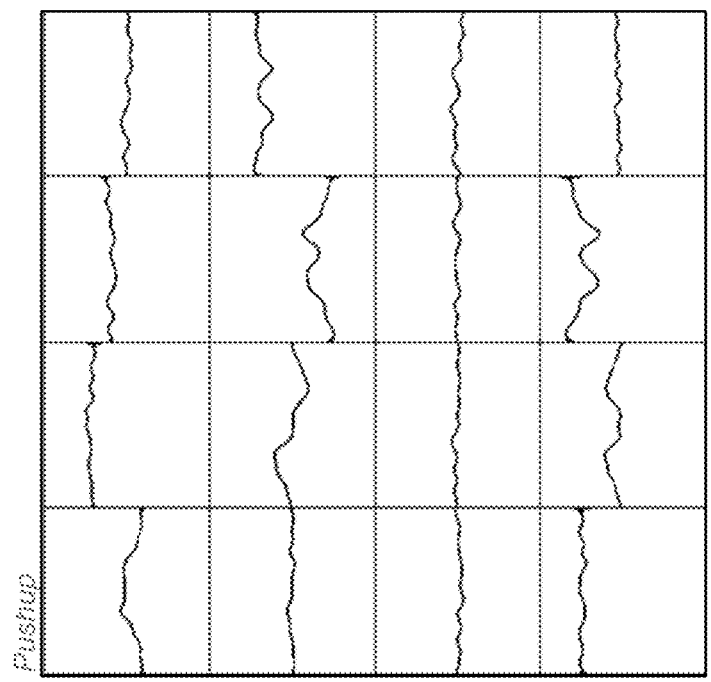
Figure 5E:
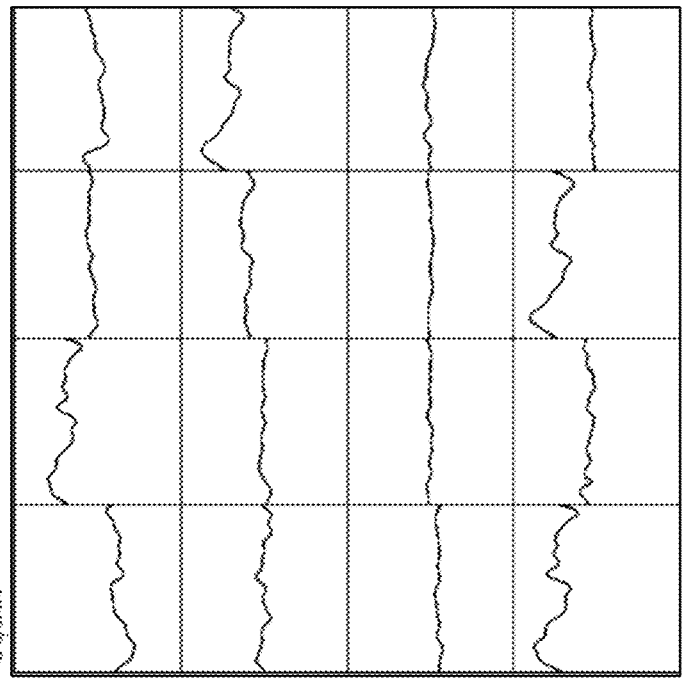

FIGS. 5A-E illustrate example images created using the peak detection window segmentation technique described above with two IMUs for various types of exercises. For example, FIG. 5A illustrate an example image for a bicep curl, FIG. 5B illustrates an example image for a weight press, FIG. 5C illustrates an example image for a pushup, FIG. 5D illustrates an example image for a situp, and FIG. 5E illustrates an example image for a squat. These images may be used, for example, for training the machine learning model to recognize exercises by movements detected by the IMUs in the wearable devices.

Figure 6:
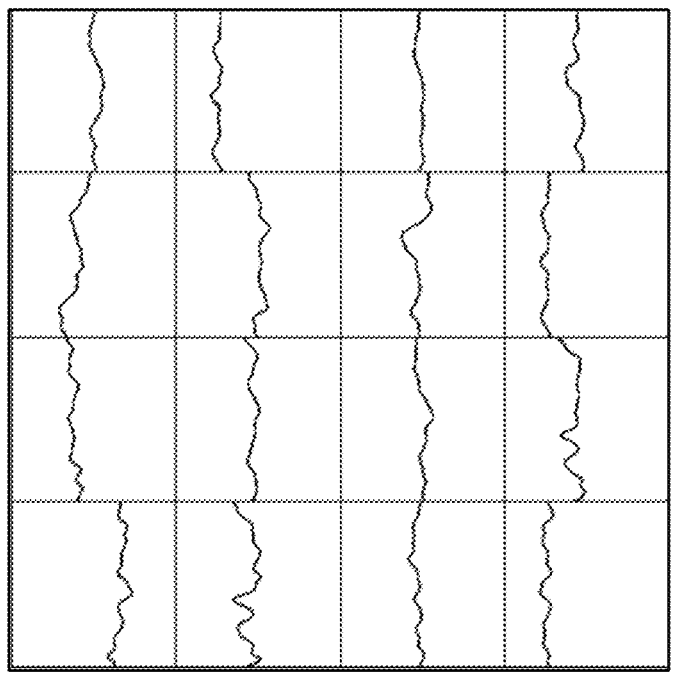
FIG. 6 illustrates an example image generated from data corresponding to non-exercise according to aspects of the disclosure.

FIG. 6 illustrates an example image for a non-exercise. Examples of non-exercises may include, without limitation, walking, climbing stairs, working at a desk, opening doors, picking up objects, etc. Non-exercise images may be included in the training data to help distinguish between particular exercise types and the non-exercises. Recognizing such distinctions may help to prevent false positive detection of exercises. While one example image in shown in FIG. 6, it should be understood that any number of example images corresponding to various non-exercises may be included in the training data.

According to another type of computation, the fixed window segmentation from the multiple IMUs, the data processing flow described above is modified by using a fixed window of a predetermined width. By way of example only, the fixed window may be 4 seconds in width, with 50% overlap. Because it is fixed, it is not synchronous with the exercise repetition, and may even have multiple or partial repetitions within a single windowed training or test example image. Because the window start is random with respect to the exercise frequency, it is possible to generate more training examples from the same set of data by varying the initial window start time. By stepping the window start time by 0.5 s, the total number of training examples per exercise is multiplied by 8.

According to yet another example, the fixed window may be autoscaled according to the repetition frequency estimate. This option does not require peak detection or thresholding.

Figure 7B:
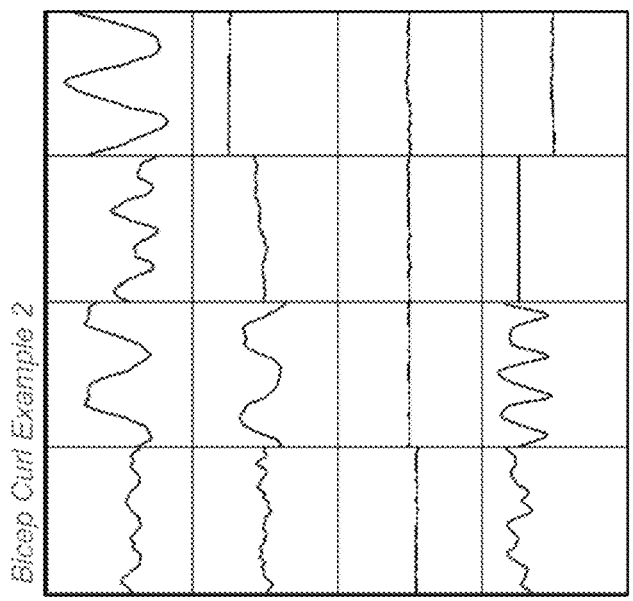
FIGS. 7A-B illustrate images generated from data using a second technique and corresponding to an example exercise according to aspects of the disclosure.
Figure 7A:
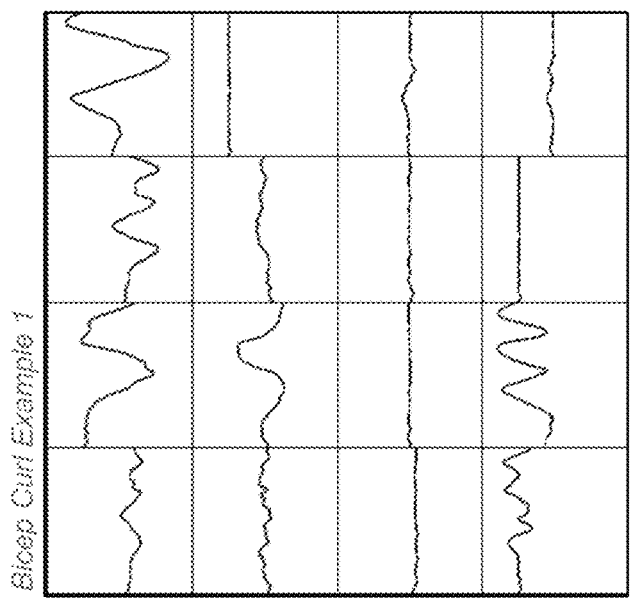

FIGS. 7A-B illustrate example images of exercises using fixed window segmentation. In these examples, FIG. 7A represents a first example of a bicep curl, and FIG. 7B represents a second example of a bicep curl. For example, the first example of FIG. 7A was generated using a first start time for the window, while the second example of FIG. 7B was generated using a second start time different than the first start time. For example, if using a 4 s window, the second start time may be anywhere between 0.5 s-3.5 s later than the first start time. However, it should be understood that the width of the window may be varied, such as by using 2 s, 6 s, 10 s, etc. Moreover, the start time increments for the window may also be varied from 0.5 s to any other value. The machine learning model thus learns patterns within the image, without relying on specific start or stop points.

In addition to being able to classify exercise type, the number of repetitions of a given exercise type may be counted in real time. With peak detector windowing, each test image, when classified, becomes a single repetition. With fixed windowing, counting repetitions may be performed using a different method, such as autocorrelation or model instantiation.

Figure 8:
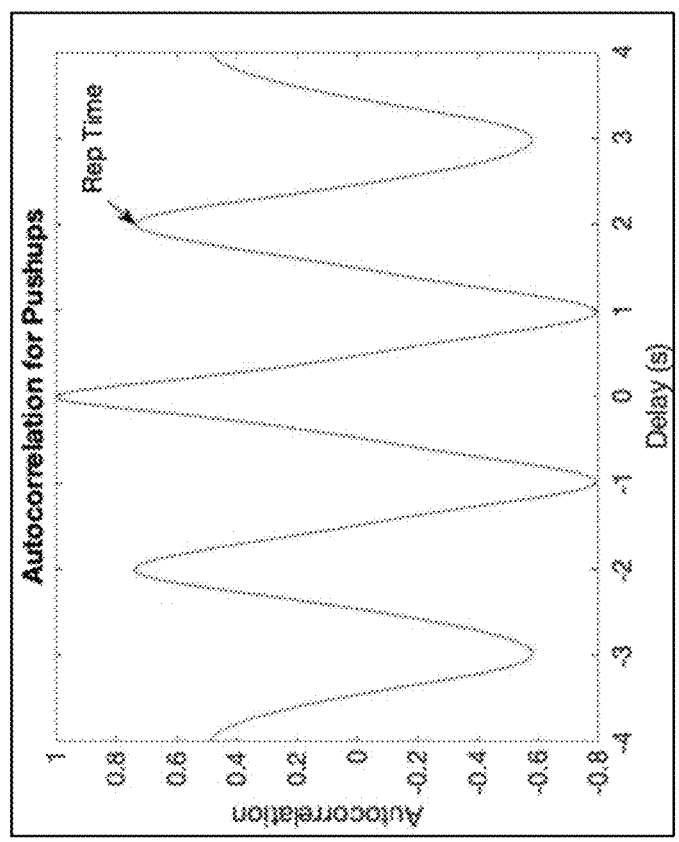
FIG. 8 is an example graph illustrating autocorrelation according to aspects of the disclosure.

In using auto-correlation, a sliding auto-correlation window of a fixed duration is used during exercise. The repetition frequency can therefore be extracted. FIG. 8 illustrates an example of autocorrelation. Using a 4 s sliding window during 10 s of pushups, an indicator of repetition frequency can be extracted. For example, the indicator may be the location of the highest peak, excluding the peak at time t=0. Once the repetition frequency is known, the number of repetitions in a given exercise sequence can be calculated as the exercise duration in seconds multiplied by the repetition frequency. As long as the devices are detecting a specific exercise type, a timer could run to track total duration. Using this method, the user could receive an update once every few seconds on a repetition counter.

In using instantiation, the model could learn to count the repetitions itself by using instantiation. In this method, the model is trained not only with labeled examples, but also with segments, or "instances" of a repetition. For example, in a training example image that contains 10 repetitions, each repetition may be labeled in the training example. In this way, the model learns to estimate how many repetitions are in a given image.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 9:
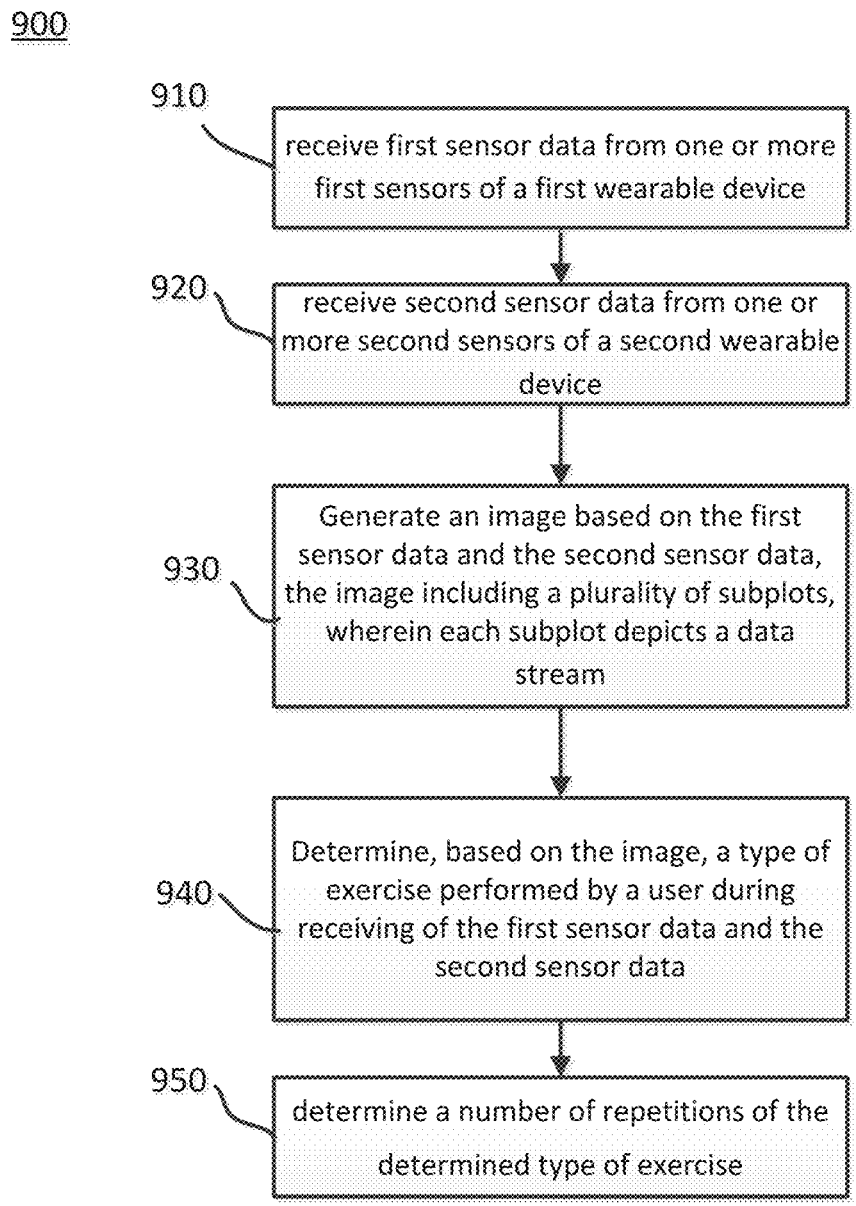
FIG. 9 is a flow diagram illustrating an example method of detecting a type of exercise being performed by a user according to aspects of the disclosure.

FIG. 9 illustrates an example method 900 of detecting a type of exercise being performed by a user. The method may be performed by one or more processors in a first or second wearable device or in a host device in communication with the wearable devices.

In block 910, first sensor data is received from one or more first sensors of the first wearable device. The first wearable device may be, for example, an earbud. The one or more first sensors may include an IMU, such as including a gyroscope and accelerometer. Each of the gyroscope and accelerometer may produce data streams for measurements in the x, y, and z directions.

In block 920, second sensor data is received from one or more second sensors of the second wearable device. The second wearable device may be, for example, a smartwatch. Similar to the first sensors, the one or more second sensors may also include an IMU producing data streams for measurements in multiple spatial directions.

In block 930, an image is generated based on the first sensor data and the second sensor data. The image may include a plurality of tiles or subplots, wherein each tile or subplot depicts a separate data stream from the first and second sensors. For example, a first tile depicts a data stream from the accelerometer of the first sensor in the x direction, a second tile depicts a data stream from the accelerometer of the first sensor in the y direction, and so on. Using two IMUs, each having two sensors measuring in three directions, twelve tiles may be generated. Additionally, each set of three (x, y, z) axes can be combined into a spatial norm, for a final total of 16 data capture tiles per image.

In block 940, a type of exercise performed by the user during receipt of the first and second sensor data is determined based on the type of exercise. For example, a machine learning model is applied to the generated image. The machine learning model may be trained using image data, as described in further detail below in connection with FIG. 10. The machine learning model may be, for example, an image based deep neural network, such as a convolutional neural network (CNN).

In block 950, a number of repetitions of the exercise may be determined. For example, the machine learning model may be trained to recognize repetitions if it is trained with images wherein the repetitions are labeled. According to other examples, the repetitions may be detected by using autocorrelation to determine a repetition frequency, and then multiplying that repetition frequency by a duration of the exercise type.

Figure 10:
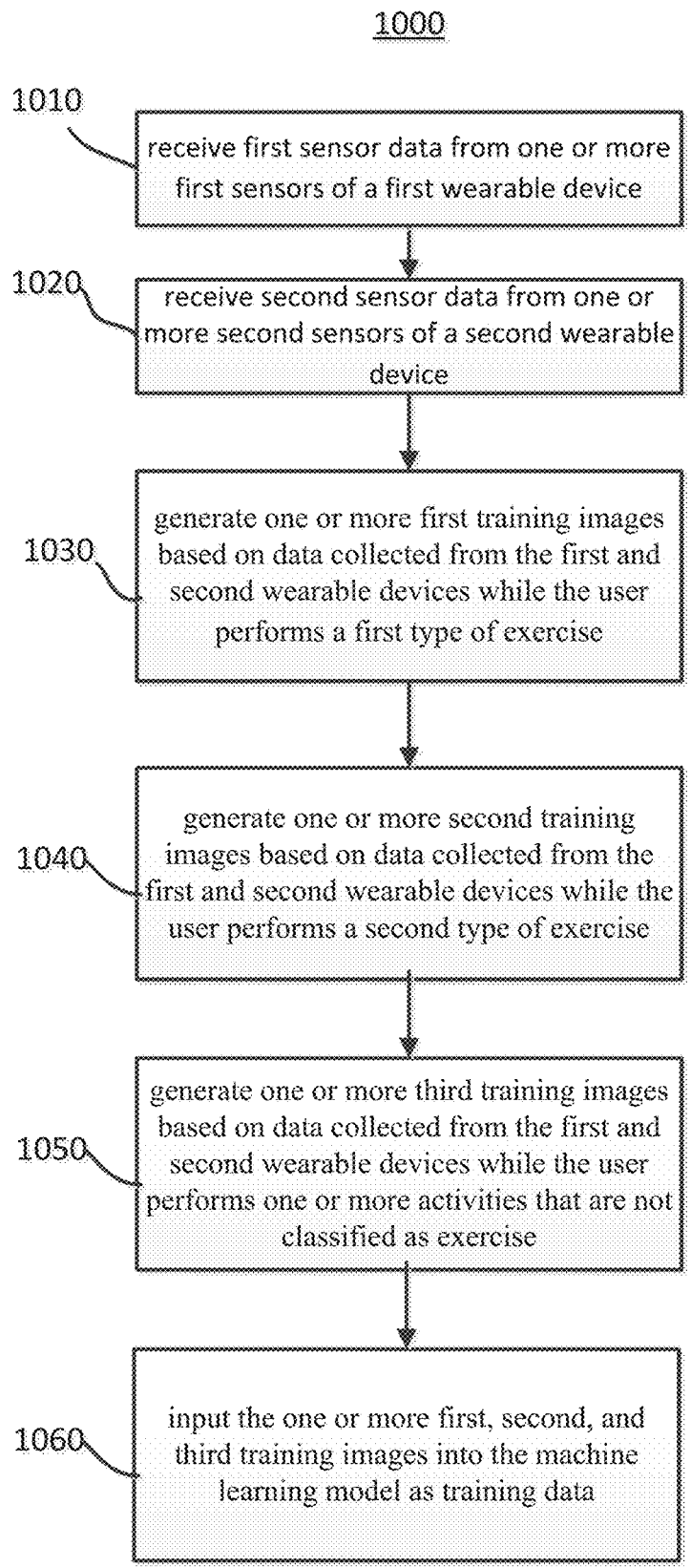
FIG. 10 is a flow diagram illustrating an example method of training a machine learning model to detect exercise types according to aspects of the disclosure.

FIG. 10 illustrates an example method 1000 of training a machine learning model to detect exercise types. The method may be performed, for example, by one or more processors in a wearable device, a coupled host device, and/or on a remote server connected to the wearable devices or host through a network.

In blocks 1010-1020, data may be received as described above in connection with blocks 910-920 of FIG. 9. However, the data may be received over an extended period of time as the user performs several types of exercises and non-exercises.

In block 1030, the received data may be used to generate one or more first training images. For example, similar to generation of the image described above in connection with block 930 or FIG. 9, the first training image may include a plurality of image tiles, each depicting a different data stream for data collected while the user was performing a first type of exercise. Similarly, in block 1040, the received data may be used to generate a second training image depicting data streams collected while the user was performing a second type of exercise different than the first type. This may be repeated for any number of different types of exercise.

In block 1050, a third training image is generated using techniques similar to those described in block 1030. However, the third training image may correspond to non-exercise. For example, the data represented in the tiles of the third image may be collected while the user is performing activities other than specific exercises. Such activities may include any of a variety of non-exercises, such as teeth-brushing, cooking, sitting, etc.

In block 1060, the first, second, and third images are input to the machine learning model as training data. In this regard, the machine learning model learns to recognize various types of exercises, as well as to distinguish such exercises from non-exercises. Such distinction can help to reduce false positive detections.

The foregoing system and methods are advantageous in that they provide for highly accurate detection of exercises using IMUs in products available to and commonly used by users.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for detecting exercise, comprising:
   receiving, by one or more processors, first sensor data from one or more first sensors of a first wearable device;
   receiving, by the one or more processors, second sensor data from one or more second sensors of a second wearable device;
   determining, using the one or more processors executing a machine learning model, a type of exercise performed by a user during receiving of the first sensor data and the second sensor data; and
   training the machine learning model, wherein the training comprises generating one or more first training images based on data collected from the first and second wearable devices while the user performs a first type of exercise and inputting the one or more first training images into the machine learning model as training data, wherein the data collected from the first and second wearable devices comprises movement data of the first and second wearable devices in x, y, and z directions.

2. The method of claim 1, the training further comprising generating one or more second training images based on data collected from the first and second wearable devices while the user performs a second type of exercise; and
   inputting the one or more second training images into the machine learning model as training data.

3. The method of claim 1, the training further comprising generating one or more third training images based on data collected from the first and second wearable devices while the user performs one or more activities that are not classified as exercise; and
   inputting the one or more third training images into the machine learning model as examples of non-exercise.

4. The method of claim 1, wherein generating the one or more first training images comprises peak detection window segmentation.

5. The method of claim 1, wherein generating the one or more first training images comprises fixed window segmentation.

6. The method of claim 5, wherein the fixed window segmentation comprises varying a start time of a window having a predetermined length of time, wherein each variation of the start time in the window generates a separate one of the one or more first training images.

7. The method of claim 5, further comprising autoscaling a time length of the window based on a most recent repetition frequency estimate.

8. The method of claim 1, further comprising determining a number of repetitions of the determined type of exercise.

9. The method of claim 8, wherein determining the number of repetitions comprises:
   determining a repetition frequency using a sliding auto-correlation window; and
   computing the number of repetitions based on the repetition frequency and a duration of the type of exercise.

10. The method of claim 8, wherein determining the number of repetitions comprises:
    counting a number of repetitions in a training image;
    labeling the repetitions in the training image;
    inputting the training image into a machine learning model as training data.

11. A system for detecting exercise, comprising:
    one or more first sensors in a first wearable device;
    one or more second sensors in a second wearable device; and
    one or more processors in communication with the one or more first sensors and the one or more second sensors, the one or more processors configured to:
    receive first sensor data from the one or more first sensors of the first wearable device;
    receive second sensor data from the one or more second sensors of the second wearable device;
    determine a type of exercise performed by a user during receiving of the first sensor data and the second sensor data, wherein determining the type of exercise performed comprises executing a machine learning model; and
    train the machine learning model, the training comprising:
    generating one or more first training images based on data collected from the first and second wearable devices while the user performs a first type of exercise; and
    inputting the one or more first training images into the machine learning model as training data, wherein the data collected from the first and second wearable devices comprises movement data of the first and second wearable devices in x, y, and z directions.

12. The system of claim 11, wherein the first wearable device is an earbud and the second wearable device is a smartwatch.

13. The system of claim 11, wherein the one or more processors reside within at least one of the first wearable device or the second wearable device.

14. The system of claim 11, wherein at least one of the one or more processors resides within a host device coupled to the first wearable device and the second wearable device.

15. The system of claim 11, further comprising:
    generating one or more second training images based on data collected from the first and second wearable devices while the user performs a second type of exercise;
    generating one or more third training images based on data collected from the first and second wearable devices while the user performs one or more activities that are not classified as exercise; and
    inputting the one or more second, and third training images into the machine learning model as training data.

16. The system of claim 11, wherein generating the one or more first training images comprises peak detection window segmentation.

17. The system of claim 11, wherein generating the one or more first training images comprises fixed window segmentation, the fixed window segmentation comprises varying a start time of a window having a predetermined length of time, wherein each variation of the start time in the window generates a separate one of the one or more first training images.

18. The system of claim 11, wherein the one or more processors are further configured to determine a number of repetitions of the determined type of exercise by:
    determining a repetition frequency using a sliding auto-correlation window; and
    computing the number of repetitions based on the repetition frequency and a duration of the type of exercise.

19. The system of claim 11, wherein the one or more processors are further configured to determine a number of repetitions of the determined type of exercise by:
- counting a number of repetitions in a training image;
- labeling the repetitions in the training image;
- inputting the training image into a machine learning model as training data.

20. A non-transitory computer-readable medium storing instructions executable by one or more processors in for performing a method of detecting a type of exercise, comprising:
- receiving first sensor data from one or more first sensors of a first wearable device;
- receiving second sensor data from one or more second sensors of a second wearable device;
- determining a type of exercise performed by a user during receiving of the first sensor data and the second sensor data, wherein determining the type of exercise performed comprises executing a machine learning model; and
- training the machine learning model, wherein the training comprises generating one or more first training images based on data collected from the first and second wearable devices while the user performs a first type of exercise and inputting the one or more first training images into the machine learning model as training data, wherein the data collected from the first and second wearable devices comprises movement data of the first and second wearable devices in x, y, and z directions.

* * * * *